United States Patent [19]

Grego

[11] Patent Number: 4,830,513
[45] Date of Patent: May 16, 1989

[54] DISTRIBUTED TEMPERATURE SENSOR WITH OPTICAL-FIBER SENSING ELEMENT

[75] Inventor: Giorgio Grego, Venaria Reale, Italy

[73] Assignee: CSELT - Centro Studi e Laboratori Telecomunicazioni S.P.A., Turin, Italy

[21] Appl. No.: 122,057

[22] Filed: Nov. 18, 1987

[30] Foreign Application Priority Data

Nov. 24, 1986 [IT] Italy ............................... 67871 A/86

[51] Int. Cl.$^4$ .................. G01B 9/02; G01K 11/00; G01N 21/47
[52] U.S. Cl. ..................................... 374/131; 356/43; 356/349
[58] Field of Search ................ 374/131, 130, 160; 356/359, 349, 43

[56] References Cited

U.S. PATENT DOCUMENTS

| | | | |
|---|---|---|---|
| 3,622,243 | 11/1971 | Wada | 356/301 |
| 4,151,747 | 5/1979 | Gottlieb et al. | 374/161 |
| 4,365,896 | 12/1982 | Mihalow | 356/446 |
| 4,542,987 | 9/1985 | Hirschfield | 374/161 X |
| 4,576,485 | 3/1986 | Lambert | 374/130 |
| 4,610,552 | 9/1986 | Kobayashi et al. | 374/160 |
| 4,652,131 | 3/1987 | Fercher et al. | 356/349 |
| 4,710,026 | 12/1987 | Magome et al. | 356/349 |

FOREIGN PATENT DOCUMENTS

2140554  11/1984  United Kingdom ............... 374/131

Primary Examiner—Daniel M. Yasich
Attorney, Agent, or Firm—Herbert Dubno

[57] ABSTRACT

The distributed temperature sensor employs an optical fiber as sensing element located in an ambient or near a body of which the temperature is to be monitored or measured. A source of light pulses sends into the fiber, pulses of predetermined duration. The backscattered radiation is collected for each pulse and the frequency spectrum variations in the backscattered radiation with respect to the incident radiation are analyzed. A computer obtains the temperature from said variations. The source and the spectrum variation analyzer are part of an optical time domain reflectometer which allows the temperature information to be associated with the information on the position of the backscattering point along the fiber.

5 Claims, 1 Drawing Sheet

DISTRIBUTED TEMPERATURE SENSOR WITH OPTICAL-FIBER SENSING ELEMENT

FIELD OF THE INVENTION

The present invention relates to optical fiber sensors and, more particularly, to a distributed temperature sensor in which the fiber is the sensing element.

BACKGROUND OF THE INVENTION

Distributed temperatures sensors are advantageously employed whenever the temperature is to be determined in different points of a relatively wide ambient, as they eliminate the drawbacks inherent with collecting an transferring information from a great number of individual sensors. Optical fiber sensors in particular have the advantage of being resistent to high temperatures and, if the fiber is used also as transmission means, they also allow remote monitoring and hence can be used to detect temperature in regions which are not accessible or are accessible only with difficulty and/or risk.

A number of temperature sensors employing an optical fiber as sensing element are known in the art.

For instance, U.S. Pat. No. 4,576,485 discloses a sensor in which the fiber is capable of internally generating thermal radiation in response to the temperature of the monitored region and has constant and discrete absorption values for each wavelength of the radiation spectrum; temperatures values along the fiber are obtained by measuring the power associated with a plurality of spectral bands into which the fiber output radiation is subdivided.

This system has a number of drawbacks: it requires the use of special fibers (fibers for infrared) which are not yet commercially available; and it is based on the detection of absorption peaks of an internally generated radiation and hence, with certain wavelengths, the fiber output power may be insufficient for detection, so that the temperature data may be imprecise.

Another distributed temperature sensor is disclosed by M. C. Farries, M. E. Fermann, R. I. Laming, S. B. Poole, D. N. Payne and A. P. Leach in the article "Distributed temperature sensor using N$^{3+}$ doped optical fiber", Electronics Letters, Vol. 22, No. 8, Apr. 10, 1986. In this known sensor, a radiation is launched into the fiber and the attenuation of the backscattered radiation is measured at the wavelengths corresponding to the absorption peaks due to Nd ions, such attenuation being dependent on the doping-ions concentration and on temperature. The measurements on the backscattered radiation are effected by an optical time domain reflectometer (OTDR) which allows the attenuation information to be associated with a position along the fiber. Thanks to the use of a radiation launched from the outside into the fibre, this system is free from the sensitivity problems of the sensor of the identified U.S. patent, provided the power source is sufficiently high. Yet it still requires the use of a special fiber and the precision of the information obtained depends on the precise knowledge of the dopant concentration. Moreover attenuation measures are effected, so that the resultant also depend on the precise knowledge of the source power.

OBJECT OF THE INVENTION

On the contrary the present invention provides a sensor which does not require especially treated fibers and which supplies information independent of the power of the source employed.

SUMMARY OF THE INVENTION

The sensor according to the invention comprises: an optical fiber, which is located at least for a part of its length within a region or near a body whose temperature is to be measured and has a softening point higher than the maximum temperature attainable by the region or body monitored; means for sending electromagnetic radiation pulses into said fibre; and means for collecting the radiation backscattered in the fiber. According to the invention, the means for collecting the backscattered radiation comprises means for determining the variations in the backscattered radiation spectrum relative to the spectrum of the radiation launched into the fibre and for associating said spectrum variations with the backscattering point along the fiber, the means determining the spectral variations being connected with a computing means obtaining the temperature values from these variations.

The sensor of the invention is based upon the discovery that electromagnetic radiation launched into optical fibre undergoes not only an attenuation but also a temperature-dependent variation in its frequency spectrum because of scattering by the molecules of the material. More particularly, the backscattered radiation spectrum exhibits, in addition to the line of the incident radiation spectrum, a further line due to Rayleigh scattering, said further line having a width of $\delta\nu_{RW}$:

$$\delta\nu_{RW} = \frac{3KT}{8\pi^2 a^3 \eta}$$

where:
K = wave vector of the radiation used for the measurement;
T = absolute temperature
a = radius of the particles, and
$\eta$ = viscosity of the material.

By measuring the linewidth $\delta\nu_{RW}$, the temperature of the body can be immediately obtained, as the fibre viscosity is substantially constant as long as the temperature of the monitored ambient or body is sufficient lower than the fibre softening temperature.

The sensor based upon the scattering analysis solves the problems mentioned above: in effect, the scattering occurs in all fibres, and hence conventional fibers, e.g. made of silica glass, can be used without the need to resort to fibers made with special materials or with an ad hoc doping. Moreover, the measurement of a spectral linewidth, contrary to the attenuation measurement, gived results independent of the optical power launched inyto the fiber.

The means detecting the spectrum variations can be an optical means which operates directly on the scattered beam outgoing from the fiber and can comprise e.g. a Fabry—Perot interferometer. Preferably however, for each pulse of electromagnetic radiation a beat is created between a pulse fraction which is sent to a detector along a path outside the fiber and the radiation resulting from the backscattering of the residue pulse fraction, and the frequency variations of the electric pulse representative of such a beat are analyzed. That alternative embodiment has the advantage of a greater sensibility.

In order that the spectrum variations can be associated with the position along the fiber, the means detecting such variations will be embodied in a measuring system based upon the above mentioned optical time domain reflectometry techniques.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
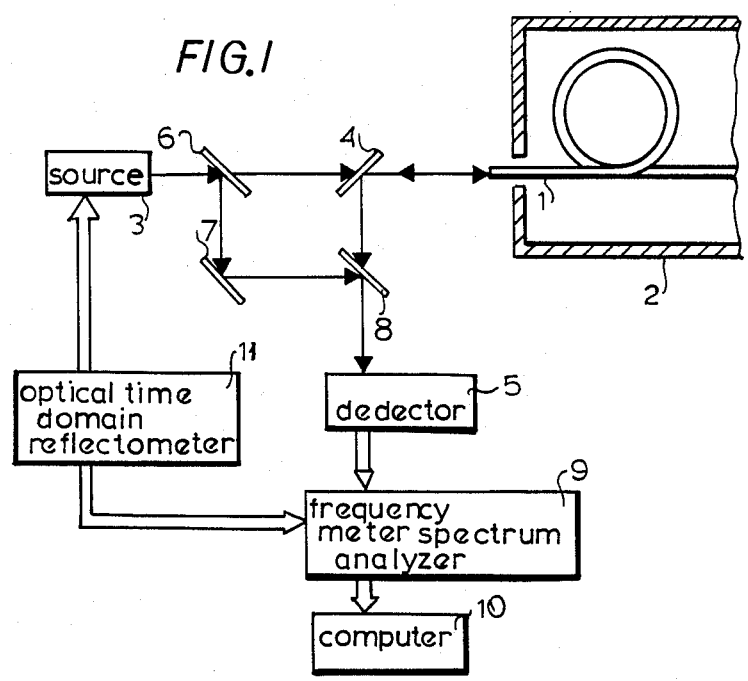
FIG. 1 is a diagram which schematically shows a distributed temperature sensor according to the invention.

In the drawing, at least part of the length of a conventional silica-glass optical fiber 1 is located within an ambient 2 of which the temperature is to be monitored or which contains a body whose temperature is to be measured.

A light source 3 is arranged to send towards one end of fiber 1 light pulses with predetermined duration and frequency, through a beam splitter 4 arranged so as to collect the radiation backscattered in the fiber and to send the backscatter to a detector 5 which forms the collecting means with mirror 8.

The latter receives also a fraction of the power associated with each pulse sent to the fiber and creates an electric signal representing a beat frequency between the radiation emitted by the source 3 and the radiation backscattered by the fiber. That power fraction is taken for instance by means of a second beam splitter 6 and is made to arrive at the detector by means of mirrors 7, 8. The beat frequency occurs because the frequency of the backscattered radiation differs from that of the incident radiation at least due to the pressure of the Rayleigh scattering line. Since the width of the Rayleigh line varies with temperature, the frequency of the detector output signal (equal to the difference of the frequencies of the two input signals) to the detector derived from the incident radiation to the fiber and the backscattered radiation, respectively, will vary with temperature.

The electrical output signal of detector 5 is sent to a device (analyzer means) 9 capable of measuring the value of the frequency thereof and to supply such a value as a function of the instant of arrival of the signal and hence of the position of the scattering point along the fiber. To this end, device 9 may for instance comprise a spectrum analyzer connected, together with source 3, in the electronic circuitry of an OTDR system, schematized by block 11. The details of that circuitry are not shown, as its structure is well known to the skilled in the art. A computing system 10 will obtain from each frequency value the value of the temperature in the corresponding point.

Besides the advantages already described, a sensor according to the invention offers a high sensitivity. In effect the scattering line is some ten MHzs wide, and commercially available spectrum analyzers, even not particularly sophisticated and hence of relatively low cost, can measure such a value with a precision of some KHzs. Therefore, in the range of the temperatures measurable by means of a silica-glass optical fibre (up to about 1,500° K.), the sensor can detect temperature differences from the hundredths to the tenths of a degree, depending on the value of the temperature T.

Figure 2:
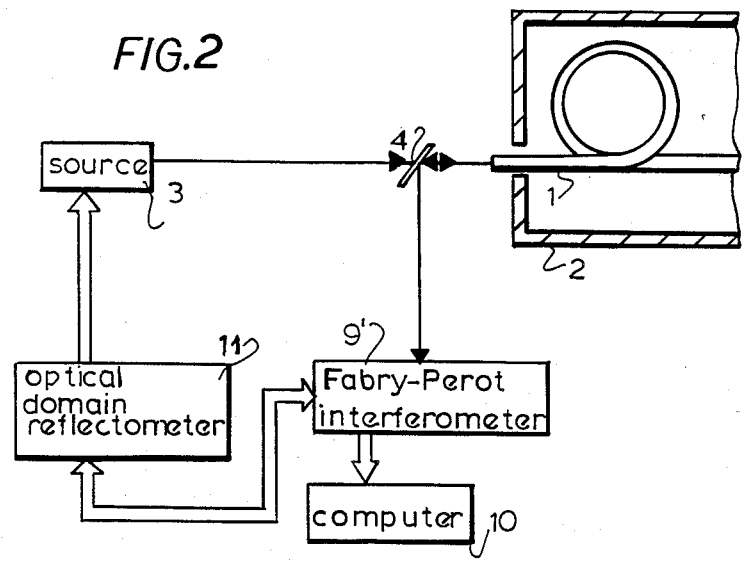
FIG. 2 is a diagram of another embodiment.

As an alternative to the beat frequency measurement, when the above sensitivity is not required and best seen in FIG. 2, the width of the Rayleigh line can be measured directly on the fibre output radiation, for instance by a Fabry-Perot interferometer 9' also connected in an OTDR (optical time domain reflectometer) system 11 to allow the frequency information to be associated with the position in the fibre.

I claim:

1. A distributed-temperature sensor, comprising:
   an optical fiber located over at least part of its length in a region within which temperature is to be measured and having a softening point in excess of a maximum temperature of said region;
   means including an electromagnetic-radiation source for sending electromagnetic radiation of an input frequency spectrum into an end of said optical fiber;
   collecting means at said end of said optical fiber for collecting backscattered radiation with a backscatter frequency spectrum therefrom;
   analyzer means connected to said collecting means and to said source for comparing collected backscattered radiation with radiation from said source for determining variations of line width of said backscatter frequency spectrum from said inoput frequency spectrum for a plurality of respective backscatter-source points along said fiber; and
   computing means connected to said analyzer means for deriving measured-temperature values from said variations for said points along said optical fiber.

2. The distributed-temperature sensor defined in claim 1 wherein said analyzer means includes:
   means for measuring a Rayleigh-scattering line width of the backscattered radiation; and
   an optical domain reflectometer connected to said source and said means for measuring said Rayleigh-scattering line width.

3. The distributed-temperature sensor defined in claim 1 wherein:
   said means for sending said electromagnetic radiation into said end of said optical fiber includes a beam splitter between said source and said end of said optical fiber for producing a path of the electromagnetic radiation outside said fiber;
   said collecting means includes a detector responsive to said backscattered radiation and to said electromagnetic radiation of said path for producing a beat frequency representing a frequency difference between said backscattered radiation and said electromagnetic radiation of said path, and generating an electrical signal representing said beat frequency; and
   said analyzer means includes means for determining frequency variation of said electrical signal.

4. The distributed-temperature sensor defined in claim 2 wherein said analyzer means is an optical means for directly analyzing the backscattered radiation outgoing from said end of said fiber.

5. A distributed-temperature sensor, comprising:
   an optical fiber located over at least part of its length in a region within which temperature is to be measured and having a softening point in excess of a maximum temperature of said region;
   means including an electromagnetic-radiation source for sending electromagnetic radiation of an input frequency spectrum into an end of said optical fiber;

collecting means at said end of said optical fiber for collecting backscattered radiation with a backscatter frequency spectrum therefrom said collecting means including a detector responsive to said backscattered radiation and to said electromagnetic radiation with said input frequencing spectrum for producing a beat frequency representing a frequency difference between said backscattered radiation and said electromagnetic radiation with said input frequency spectrum, and generating an electrical signal representing said beat frequency,;

analyzer means connected to said collecting means and including means for determining frequency variation of said electrical signal for determining variations of said backscatter frequency spectrum relative to said input frequency spectrum for respective backscatter-source points along said fiber, said analyzer means including:

means for measuring a Rayleigh-scattering line width of the backscattered radiation, and an optical domain reflectometer connected to said source and said means for measuring said Rayleigh-scattering line width; and computing means connected to said analyzer means for deriving measured-temperature values from said variations for said points along said optical fiber, and wherein:

said means for sending said electromagnetic radiation into said end of said optical fiber includes a beam splitter between said source and said end of said optical fiber for producing a path of the electromagnetic radiation outside said fiber.

* * * * *